May 20, 1941.   J. LA ROCCA   2,242,648
ANIMAL TRAP
Filed Sept. 3, 1940
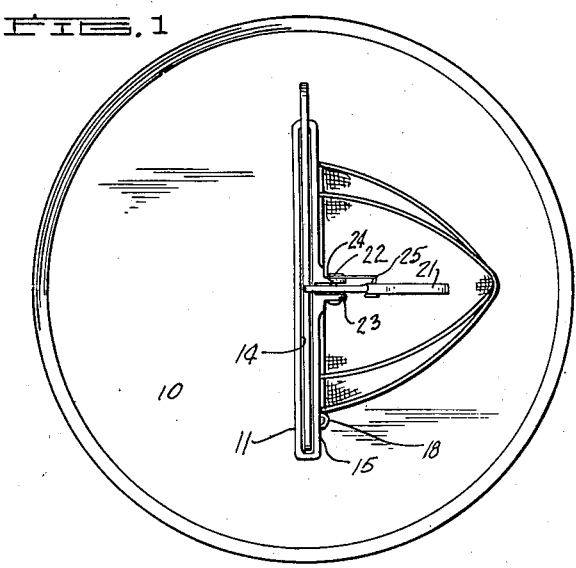
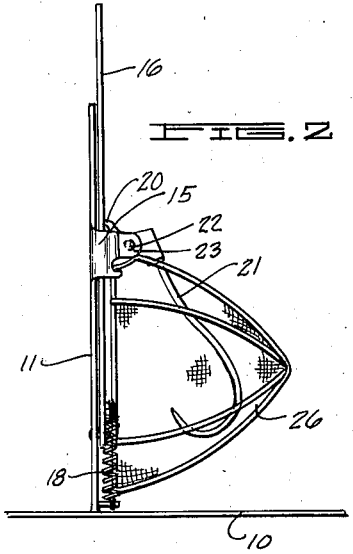
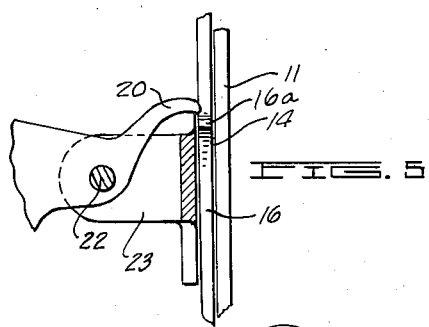
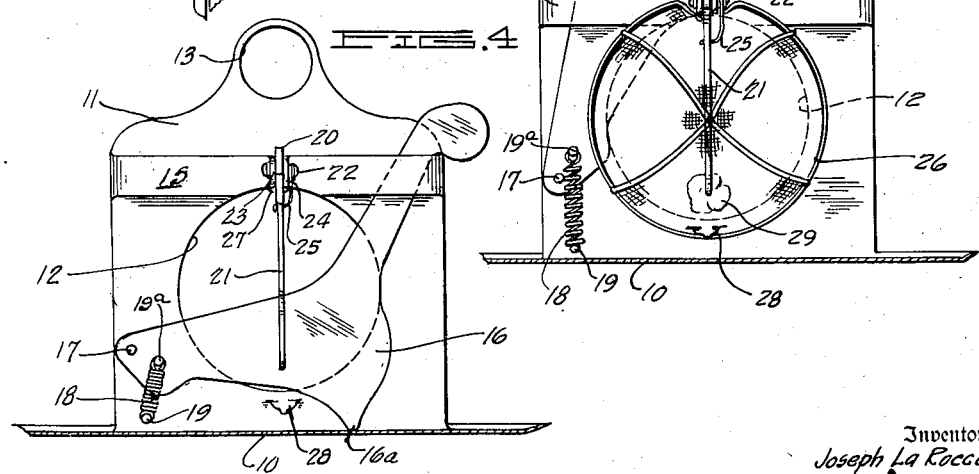
Inventor
Joseph La Rocca
By John A. Bommhardt
Attorney Patented May 20, 1941

2,242,648

UNITED STATES PATENT OFFICE 2,242,648

ANIMAL TRAP

Joseph La Rocca, Cleveland, Ohio

Application September 3, 1940, Serial No. 355,115

3 Claims. (Cl. 43—85)

My invention relates to animal traps and in particular to a trap which is used primarily for trapping rodents in buildings.

One object is to provide a device that is both novel and particularly effective in operation.

Another object is to provide a device for catching or killing rodents, and which may be set with no risk of injury but with a positive releasing action.

These and other objects may be seen and noted from the following specification and its accompanying illustration in which:

Figure 1 is a top plan view of the device.

Figure 2 is a side elevation of Figure 1.

Figure 3 is a rear elevation of the device in locked position.

Figure 4 is a similar view in released position.

Figure 5 is an enlarged fragmentary portion of the lever and catch.

Again referring to the drawing, a base 10 has secured thereto a perpendicular plate 11 having a circular aperture or opening 12 therethrough of sufficient size to permit the projecting therethrough of the head of the animal to be caught or trapped.

A smaller aperture or opening 13 through the set top portion of the plate 11 is merely to aid in setting the trap by providing a finger or hand hold.

A slot or guide 14 is formed above the aperture 12 by a bent bar or band 15 secured at its outer ends to the outer edges of the plate 11, said slot or guide having mounted therein a lever 16 which pivots on a pin 17 through the plate 11, adjacent the lower outer edge of said plate.

A spring 18 is secured at one end to a pin 19 in the plate 11, the opposite end being secured to a pin 19a in the lever 16, the size of this spring 18 regulates the force of the drop when the lever 16 is released.

The lever 16 has a protuberant point 16a which forms a stop as the lever drops. A catch 20 presses frictionally the said lever when in the set position shown in Figure 3.

The catch 20 has attached thereto a hook 21 projecting downwardly and at an angle therefrom, said catch pivoting on a pin 22 through the flanged portions or ears 23 and 24 of the bar 15, the catch projecting upwardly between said ears as illustrated in Fig. 5.

A tension spring 25 is secured around the pin 22 outside of, and adjacent to one ear, the lower end of said spring being secured around the hook 21.

A mesh or screen basket 26 forming a guard is hooked over and under catches 27 and 28 at the top and bottom respectively of the circular aperture 12. After the bait 29 has been secured on the hook 21, the lever 16 is then drawn back to the position shown in Figure 3.

To secure the bait it is necessary for the animal to thrust its head through the aperture 12, and any slight pull on the bait 29 relieves the frictional pressure of the catch 20 and releases the lever 16 which drops down across the aperture 12 as shown in Fig. 4 and pinions or kills the animal, depending upon the spring tension.

This device may be made of sufficient size and of a similar design to serve as a trap for small animals, the tension of the spring being so regulated as to cause the lever to act as a trap, imprisoning the animal but not killing it.

It will be understood that variations in the construction of this invention may be made without departing from the scope of the following claims.

I claim:

1. An animal trap comprising a base and an upstanding plate with an aperture therein and a guide above the aperture, a spring actuated lever pivoted to the plate and movable up and down through the guide, ears on the guide having a pivot pin, a pivoted catch and bait holder pivoted to the guide, said catch engaging the pivoted plate to hold the same in set position, the lever moving to trapping position when said catch is released.

2. The combination stated in claim 1, and a spring mounted on the pivot pin and engaging the bait holder to hold the catch in contact with the lever.

3. An animal trap comprising a vertically supported plate having an opening therein, a spring actuated lever pivoted to the plate, a band secured to the plate above the opening and forming a working slot for the lever and terminating in ears at the rear side of the plate, a spring urged catch pivoted between the ears and having connected thereto a bait holder, said lever moving to trapping position upon release of the catch.

JOSEPH LA ROCCA.